(12) United States Patent
Strengert et al.

(10) Patent No.: US 9,403,518 B2
(45) Date of Patent: Aug. 2, 2016

(54) BRAKE SYSTEM FOR A VEHICLE AND METHOD FOR OPERATING A BRAKE SYSTEM OF A VEHICLE

(75) Inventors: Stefan Strengert, Stuttgart (DE); Michael Kunz, Steinheim an der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 13/881,699

(22) PCT Filed: Sep. 1, 2011

(86) PCT No.: PCT/EP2011/065119
§ 371 (c)(1),
(2), (4) Date: Jul. 30, 2013

(87) PCT Pub. No.: WO2012/055617
PCT Pub. Date: May 3, 2012

(65) Prior Publication Data
US 2013/0292999 A1   Nov. 7, 2013

(30) Foreign Application Priority Data

Oct. 27, 2010  (DE) .......................... 10 2010 042 990

(51) Int. Cl.
| | | |
|---|---|---|
| *B60T 13/14* | (2006.01) | |
| *B60T 13/68* | (2006.01) | |
| *B60T 8/24* | (2006.01) | |

(Continued)

(52) U.S. Cl.
CPC ............... *B60T 13/686* (2013.01); *B60T 8/246* (2013.01); *B60T 8/267* (2013.01); *B60T 8/268* (2013.01); *B60T 8/3655* (2013.01); *B60T 8/4872* (2013.01); *B60T 13/142* (2013.01); *B60T 17/04* (2013.01)

(58) Field of Classification Search
CPC .................... B60T 3/142–3/145; B60T 3/686; B60T 17/04; B60T 8/4872
See application file for complete search history.

(56) References Cited

U.S. PATENT DOCUMENTS

| | | |
|---|---|---|
| 3,749,125 A | 7/1973 | Peruglia et al. |
| 2004/0124698 A1* | 7/2004 | Nakashima et al. ........ 303/113.4 |
| 2011/0077832 A1* | 3/2011 | Niino et al. ..................... 701/70 |

FOREIGN PATENT DOCUMENTS

| | | |
|---|---|---|
| CN | 1966322 | 5/2007 |
| CN | 101022982 | 8/2007 |

(Continued)

OTHER PUBLICATIONS

International Search Report for PCT/EP2011/066119, dated Nov. 15, 2011.

*Primary Examiner* — Anna Momper
(74) *Attorney, Agent, or Firm* — Norton Rose Fulbright US LLP (57) ABSTRACT

A brake system for a vehicle includes: a main brake cylinder with a floating piston able to be shifted at least partially into the main brake cylinder, and a brake medium storage device into which a specified storage volume of a brake medium is able to be transferred without counterpressure, the brake medium storage device being hydraulically connected via an electrically controllable first valve to the main brake cylinder in such a way that, in response to a shifting of the floating piston partially into the main brake cylinder by a shift travel that is below a shift travel limit corresponding to the storage volume, a brake medium volume less than the specified storage volume is transferred without counterpressure from the main brake cylinder into the brake medium storage device.

15 Claims, 5 Drawing Sheets

(51) Int. Cl.
*B60T 8/26* (2006.01)
*B60T 8/36* (2006.01)
*B60T 8/48* (2006.01)
*B60T 17/04* (2006.01)

(56) References Cited

FOREIGN PATENT DOCUMENTS

| | | |
|---|---|---|
| CN | 101720288 | 6/2010 |
| DE | 39 12 234 | 10/1990 |
| DE | 43 22 182 | 1/1995 |
| DE | 196 04 134 | 8/1997 |
| DE | 199 63 760 A1 | 7/2001 |
| DE | 102005041983 A1 * | 3/2007 |
| DE | 10 2009 007494 | 9/2009 |
| DE | 10 2008 002 345 | 12/2009 |
| JP | 11 285102 | 10/1999 |
| JP | 2002 255018 | 9/2002 |
| WO | WO 98/31576 | 7/1998 |
| WO | WO 03/053755 | 7/2003 |
| WO | WO 2008/155045 | 12/2008 |
| WO | WO 2008155045 A1 * | 12/2008 |
| WO | WO 2010/102844 | 9/2010 |

* cited by examiner

BRAKE SYSTEM FOR A VEHICLE AND METHOD FOR OPERATING A BRAKE SYSTEM OF A VEHICLE

BACKGROUND OF THE INVENTION

1. Field of the Invention

The present invention relates to a brake system for a vehicle. Furthermore, the present invention relates to a method for operating a brake system of a vehicle.

2. Description of the Related Art

Electric and hybrid vehicles have a brake system designed for recuperative braking including an electric motor operated as a generator during recuperative braking. Following an intermediate storage, the electrical energy recovered during recuperative braking is preferably used for accelerating the vehicle. This makes it possible to reduce power loss, which occurs when braking frequently in travel, energy consumption and pollutant emission of the electric or hybrid vehicle.

However, operating the electric motor, for example the electric drive motor, in generator mode typically requires a certain minimum speed of the vehicle. A recuperative brake system is thus frequently unable to exert a regenerative braking torque on the wheels of the vehicle for as long as it takes for the moving vehicle to come a standstill. For this reason, a hybrid vehicle often, in addition to the recuperatively operated electric motor, also has a hydraulic brake system, which makes it possible, at least in a low speed range, to compensate for the lack of braking action of the recuperative brake. In this case it is possible to apply the entire braking torque via the hydraulic brake system even when the electrical energy store is full, which is when the recuperative brake usually exerts no braking torque on the wheels.

On the other hand, in some situations, it is desirable to exert the lowest possible hydraulic braking force on the wheels in order to achieve a high degree of recuperation. For example, following shifting operations, the decoupled generator is often activated as a recuperative brake in order to ensure reliable charging of the intermediate store and high energy savings.

Generally, a driver prefers a total braking torque of his vehicle, which corresponds to his actuation of a brake input element such as his brake pedal actuation, for example, irrespective of an activation or deactivation of the recuperative brake. For this reason, some electric and hybrid vehicles have an automatic system, which is supposed to take over the task of the deceleration regulator and to adapt the braking torque of the hydraulic brake system to the current braking torque of the recuperative brake in such a way that a desired total braking torque is maintained. Examples for such an automatic system are brake-by-wire brake systems, in particular, EHB systems. Due to their complex electronics, mechanics and hydraulics, however, brake-by-wire brake systems are relatively costly.

As an alternative to brake-by-wire brake systems, published German patent application document DE 10 2008 002 345 A1 describes a brake system, which includes a first brake circuit decoupled from a main brake cylinder and connected to a brake medium reservoir. This first brake circuit has a wheel axle assigned to it, onto which a recuperative braking torque of an electric motor operated as a generator may be applied. Two additional brake circuits are coupled to the main brake cylinder in such a way that the driver is able to brake into them directly and thus exert a direct hydraulic braking torque onto the wheels associated with the two additional brake circuits. In addition, the brake system has a fixed pedal free travel.

BRIEF SUMMARY OF THE INVENTION

The present invention makes possible a brake system in which the free travel of the brake operating element (such as the pedal free travel) is able to be variably specified via the electrical actuation of the first valve. Provided the first valve is controlled to an open state, the free travel of the brake actuating element has at least the length of the shift travel limit. By contrast, in case of a closed first valve, the driver is already able, during a shifting of the main brake cylinder floating piston by a shift travel, that is below the shift travel limit, i.e. at a corresponding minimal actuation of the brake actuation element, to brake directly into the main brake cylinder, and in this manner to effect a pressure increase in the main brake cylinder.

The brake system according to the present invention and the corresponding method for operating a brake system are thus distinguished by a changeable and/or disconnectible free travel of the brake actuating element. In this way, in the present invention, it is possible to utilize the advantages of a free travel of the brake actuating element for increasing the efficiency in response to recuperation, and at the same time to remove the disadvantages of a long free travel of the brake actuating element in the hydraulic fallback level.

One might also describe this by saying that, in the present invention, the free travel of the brake actuating element is optionally adjustable. Provided the first valve is open, the brake actuating element situated on the main brake cylinder has a free travel whose length corresponds to at least the shift travel limit. After a closing of the first valve, on the other hand, an actuation of the brake actuating element by an actuating travel within the optionally adjustable free travel is able to effect a pressure buildup in the main brake cylinder.

The brake medium storage device is designed so that at least a specified storage volume is able to be transferred into it free of backpressure, i.e. using a negligible force.

The shift travel limit of the main brake cylinder floating piston corresponds to a volume of the brake medium which is replaced from the main brake cylinder in response to the shifting, that is free of pressure buildup, of the main brake cylinder floating piston partially into the main brake cylinder by the shift travel limit. This displaced volume is preferably equal to the storage volume of the brake medium storage device. One may also circumscribe this as a correlation between the shift travel limit and the specified storage volume.

The free travel of the brake actuating element that is linked to the main brake cylinder is thus optionally able to be adjusted to a length that is especially preferred for the instantaneous vehicle situation and/or environmental situation.

The brake system advantageously includes a control device that is developed in such a way that, using the control device, by controlling the first valve to an at least partially open state, the braking system is able to be controlled to a first mode, in which a pressure increase in the main brake cylinder is prevented by shifting the main brake cylinder floating piston partially into the main brake cylinder by shift travel that is below the shift travel limit, and by controlling the first valve to a closed state, the brake system is able to be controlled into a second mode, in which a pressure increase in the main brake cylinder is ensured by shifting the main brake cylinder floating piston partially into the main brake cylinder by the shift travel that is below the shift travel limit. Consequently, the brake system, controlled to the first mode, has a minimal free travel, which preferably tends to zero. By contrast, the brake system controlled to the second mode has a free travel which is equivalent to at least the shift travel limit. Consequently, the advantage of a changeable or disconnectible free travel of the brake actuating element is able to be implemented in a simple manner.

For instance, the brake medium storage device includes a brake medium reservoir and/or a low-pressure storage chamber. Thus, for the brake medium storage device one may use a component that, as a rule, is already present in the brake system and/or a cost-effective additional component. In addition, such a development of the brake medium storage device does not raise or hardly raises the requirement for installation space.

In one advantageous specific embodiment, the brake system includes at least one brake circuit having at least one first wheel brake cylinder, which is hydraulically connected to the main brake cylinder via a second valve in such a way that, via the closed second valve, a pressure increase is able to be prevented in the at least one first wheel brake cylinder of the first brake circuit in response to the pressure increase in the main brake cylinder, and via the at least partially open second valve, a pressure increase in the at least one first wheel brake cylinder of the first brake circuit is transferable in response to the pressure increase in the main brake cylinder. Consequently, this specific embodiment of the present invention also makes possible the decoupling of the first brake circuit, without a simulator or fixed free travel (pedal free travel) having to be developed on the brake system. The advantageous specific embodiment is thus compatible with or transferable to preferred types of hydraulic brake systems. Because of the omission of a simulator or a fixed free travel at the braking system, it is not necessary to switch off the simulator in the hydraulic fallback level in a costly manner. Also, the driver does not have to overcome any free travel in order to cause a braking action directly in the main brake cylinder, or rather in the at least one brake circuit linked to the main brake cylinder. At the same time, using the second valve, the first brake circuit, which is assigned to one axle of the vehicle, for instance, is able to be decoupled for the effective utilization of the recuperation.

The first valve is preferably developed as a currentless closed valve and/or the second valve is developed as a currentless open valve. A currentless closed development of the first valve is connected with the advantage that, in response to a functional impairment and/or a failure of the electronics of the brake system, the free travel is automatically reduced to a minimum. The free travel, in this case, is preferably reduced to a value tending to zero, which may also be expressed as "turning off" the free travel. A currentless opened development of the second valve ensures the additional advantage that, in the case of a functional impairment/failure of the electronics of the brake system, the driver is able to brake, without free travel, directly at least into a first braking circuit. Consequently, in such a situation, the driver is still able to brake the vehicle, in a simple manner and a lightly applicable force effort.

In one simply implementable specific embodiment, using the control device, the first valve and the second valve are able to be connected in phase opposition. By the connecting in phase opposition of the first valve and the second valve, one may understand that the second valve is automatically closed when the first valve is opened, and the second valve is opened automatically when the first valve is closed. This advantageous connecting in phase opposition of the first valve and the second valve, in the advantageous development in the preceding paragraph of the two valves, is able to be implemented cost-effectively by a common supplying with current, using a current signal.

In one advantageous further development, the braking circuit includes a pump, using which an additional braking medium volume from a braking medium reservoir is able to be pumped into the at least one wheel-brake cylinder of the first brake circuit. Thus, after the closing of the second valve, there exists the possibility of actively building up/setting a hydraulic braking torque exerted by the at least one first wheel brake cylinder upon at least one associated wheel, via pumping the braking medium volume from the braking medium reservoir into the at least one first wheel brake cylinder of the first brake circuit. After a decoupling of the first brake circuit from the main brake cylinder, one may thus even still effect a braking of the associated wheels via an actuation of the pump. In particular, a reduction over time of a generator braking torque during blending may be compensated for via the pumping of the additional brake medium volume in the at least one first wheel brake cylinder.

In supplement, the brake system may include an overpressure valve situated between the delivery side of the pump and the brake medium reservoir. In this case, the pump may be situated together with at least one additional pump of the brake system on a common shaft of a motor, without the joint actuation of the pump with the at least one additional pump leading to an undesired pressure buildup/overpressure in the first braking circuit. Instead, in such a situation, the volume pumped by the pump is transferred into the brake medium reservoir via an opening of the overpressure valve. Consequently, equipping the brake system with an additional motor for the at least two pumps is not necessary, As an alternative or a supplement to the pump, the first brake circuit may include at least one continuously adjustable valve, via which the at least one first wheel brake cylinder of the first brake circuit is hydraulically connected to the braking medium reservoir in such a way that a braking medium shifting from the at least one first wheel brake cylinder of the first brake circuit is able to be controlled into the brake medium reservoir using the at least one continuously adjustable valve. Via such a brake medium shift, the hydraulic brake torque exerted by the at least one first wheel brake cylinder on the at least one associated wheel may be reduced in a simple manner. Consequently, an increase over time of a generator braking torque may be compensated for, for example.

The at least one continuously adjustable valve is preferably designed as a wheel outlet valve. Thus, the advantages described in the preceding paragraph are implementable, without an additional valve having to be situated on the brake system. This reduces the requirements on the electronic system for controlling the valves of the brake system.

The brake system may advantageously have exactly twelve controllable valves, which are controllable using at least one electrical signal provided by the control device, at least in an open state and in a closed state. A cost-effective control device is able to be used for such a brake system.

In addition, the brake system may also still include at least one second brake circuit having at least one second wheel brake cylinder, which is hydraulically connected to the main brake cylinder via a switchover valve and a main switching valve. The two brake circuits may be used in the brake system, in order, in response to an unchanged braking sensation during the actuation of the brake actuation element, instead of braking at both vehicle axles, braking optionally at a first axle assigned to the first brake circuit or at a second axle assigned to the second brake circuit, and thus to maximize the recuperative efficiency of the brake system. In particular, via closing the first valve, a sufficiently long free travel may be set and during an operation of the brake actuation element, braking may be done by an actuation path within the free travel, using the first brake circuit decoupled from the main brake cylinder, while a pressure increase takes place in the second brake circuit. This makes easier the recuperating during a brake system and makes possible an advantageous driving comfort during the blending.

We should point out again that the advantages described in the above paragraphs are implemented in a brake system which has no free travel through a gap developed between the brake actuating element and the floating piston. Thus the disadvantages of such a gap, such as, for instance, the requirement for a simulator for the artificial generation of a braking sensation before closing the gap and/or the additional operation of the driver for closing the gap are eliminated.

The present invention particularly allows for a generator braking torque to be masked, without the driver having to expend additional work. At least the at least one hydraulic braking torque of the at least one wheel brake cylinder of the first brake circuit may be set in such a way (actively) after a decoupling from the main brake cylinder, that a generator braking torque varying over time is masked, or rather that an advantageous/preferred total deceleration of the vehicle, for instance, corresponding to the operation of the brake actuating element is maintained by the driver and/or a specification of a speed-control automatic system, in spite of the generator braking torque varying over time. A masking process is ensured in this instance, which has no effects on the braking distance.

The present invention thus offers a cost-effective alternative to a conventional brake-by-wire brake system, which is very advantageous in particular for rear-wheel-drive or all-wheel-drive vehicles. However, the present invention may also be used for front-wheel drive featuring a by-wire front axle.

The present invention is not limited, however, to application in an electric or hybrid vehicle. For example, a transversal acceleration-dependent brake-force distribution may also be implemented using the present invention. In the case of a transversal acceleration-dependent brake-force distribution, the brake force at some of the wheels of the vehicle, preferably at the two rear-axle wheels, is apportioned in accordance with a vertical force that occurs when traveling around a curve. In this manner, the frictional coefficient of the wheels, especially the frictional coefficient of the two rear wheels, may be adapted to the transversal acceleration. This permits more stable braking of the vehicle in curves. To ascertain the hydraulic braking torque that is to be set actively via the first brake circuit, a transversal acceleration ascertained by a sensor device is preferably used.

In addition, it is possible to apply the present invention for dynamic braking in curves. In the case of dynamic curve braking, the braking force at a wheel on the inside of the curve is increased relative to the braking force at a wheel on the outside of the curve. This achieves a more dynamic handling performance.

In addition, the present invention may also be used for a more advantageous braking when driving in reverse. In particular, by increasing the braking force at the rear axle, a better brake-force distribution is set for driving in reverse. In this context, one also speaks of a reverse brake-force distribution. Most notably, this permits a substantially more stable braking performance in the case of a slow reverse travel on a downgrade.

In spite of the possibility of active setting of at least the (second) hydraulic braking torque exerted by the second wheel brake cylinder, after a switching of the brake system to the first operating mode, the driver is able to brake directly into the wheel brake cylinder. Thus, the driver is easily able to execute sudden braking processes.

The advantages described in the paragraphs above are also implementable by a suitable method.

DETAILED DESCRIPTION OF THE INVENTION

Figure 1:
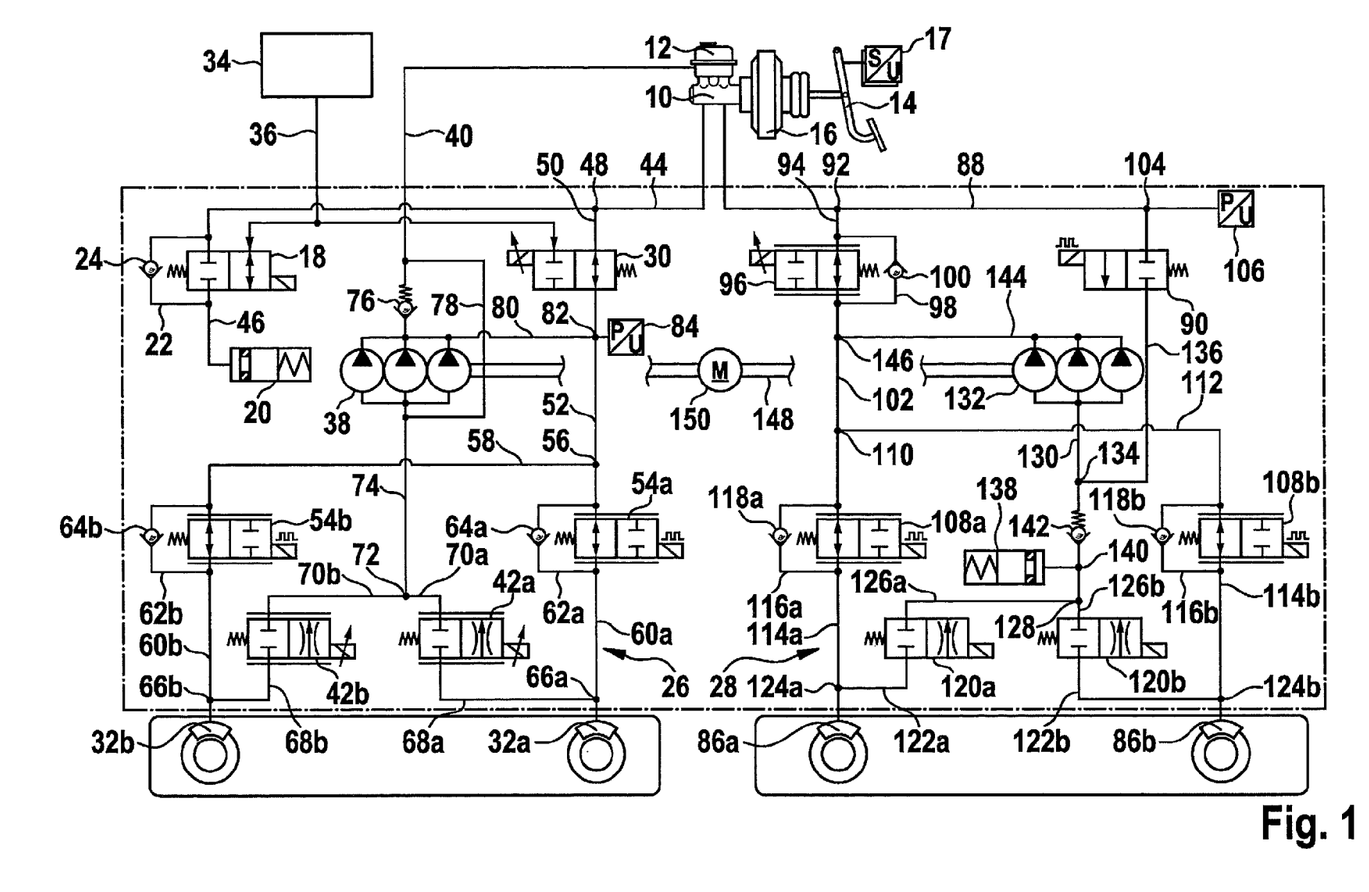
FIG. 1 shows a circuit diagram of a first specific embodiment of the brake system.

The brake system shown schematically in FIG. 1 is usable not only in an electric or hybrid vehicle. Instead, each of these brake system may also be used in a vehicle, for example, for a preferred brake force distribution at the wheels of the vehicle when braking during cornering and/or driving in reverse. The indications, described below, of the use of the brake systems in an electric or hybrid vehicle are to be understood merely by way of example.

FIG. 1 shows a circuit diagram of a first specific embodiment of the brake system.

The brake system comprises a main brake cylinder 10 and an additional brake medium reservoir 12. At main brake cylinder 10, a main brake cylinder floating piston is situated that is able to be shifted at least partially into the cylinder (not shown). By brake medium reservoir 12 one should not understand main brake cylinder 10. Instead, brake medium reservoir 12 may be understood as a brake medium volume or a brake medium container, the internal pressure of which is able to be set irrespective of an internal pressure of main brake cylinder 10 or corresponds to a definitively specified pressure such as atmospheric pressure, for example. The brake medium reservoir may thus also be designated as a brake medium storage device, in which a specified storage volume of the brake medium of main brake cylinder 10 is able to be transferred in free from back pressure. A brake medium exchange bore such as a snifting bore, for example, may be developed between main brake cylinder 10 and brake medium reservoir 12. main brake cylinder 10 and brake medium reservoir 12, however, may also be developed without a hydraulic connection.

A brake actuating element 14 such as a brake pedal may be situated on main brake cylinder 10. As an alternative or a supplement to a brake pedal, a differently developed brake actuating element 14 may also be used. By operating brake actuating element 14, a driver of the vehicle equipped with the brake system is able to effect a pressure increase in an internal volume of main brake cylinder 10. Preferably, a brake booster 16 is also situated on main brake cylinder 10 in such a way that a pressure increase in the interior volume of main brake cylinder 10 may be effected by brake booster 16 as well. Brake booster 16 may be a pneumatic, hydraulic brake booster and/or an electromechanical brake booster, for example. It should be noted, however, that the feasibility of brake booster 16 is not limited to the examples listed here.

Optionally, a sensor 17 may also be situated on brake actuating element 14 in such a way that an operation of brake actuating element 14 by the driver is detectable by the sensor 17. Preferably, sensor 17 is designed to supply a braking force signal and/or braking distance signal, corresponding to the operation of brake actuating element 14, to an evaluation electronics/control electronics (not shown). A possibility for using the information provided by sensor 17 will be explained in more detail below. To be cost-effective, sensor 17 may be a subunit of brake booster 16. Sensor 17 may also be a pedal-travel sensor, a booster diaphragm-travel sensor and/or a rod-travel sensor. However, the practicability of sensor 17 is not limited to the examples enumerated here.

The brake system has an electrically controllable first valve 18, via which a storage chamber 20 is connected hydraulically to main brake cylinder 10. The hydraulic connection between storage chamber 20 and main brake cylinder 10 is developed in such a way that, in the event of the shift of the main brake cylinder floating piston partially into main brake cylinder 10 by a shift travel below a specified shift travel limit, a brake medium volume is transferable, free of back pressure, from main brake cylinder 10 into storage chamber 20 via the (at least partially) opened first valve 18. This is able to be ensured, since storage chamber 20 is developed as a brake medium storage device, into which a specified storage volume of the brake medium is able to be transferred in free of back pressure. The specified shift travel limit is equivalent to the specified storage volume. This may also be expressed as a volume equal to the storage volume of storage chamber 20 being displaced from main brake cylinder 10 in response to the shifting in of the main brake cylinder floating piston while maintaining a constant main brake cylinder internal pressure. Consequently, a pressure buildup during a shifting in of the main brake cylinder floating piston by a shifting by a shift travel of at least the shift travel limit is able to be prevented via an (at least partially) opening of first valve 18. The advantages coming about in this context are described below in greater detail.

Storage chamber 20 may be a low pressure storage chamber, for example. For first valve 18, a separating valve/switching valve may be used, which may only be controlled electrically into an open mode and a closed mode. Parallel to first valve 18, a bypass line 22 having a check valve 24 is preferably developed which prevents a braking medium displacement via bypass line 22 from main brake cylinder 10 into storage chamber 20.

The brake system is able to be controlled by an (at least partial) opening of first valve 18 into a mode, in which a pressure increase in main brake cylinder 10 in response to the shifting in of the main cylinder floating piston by a shift travel below the shift travel limit is prevented. This may also be described so that the brake system controlled in the first mode has a "shift travel" corresponding to the shift travel limit. Provided first valve 18 is (at least partially) open, brake actuating element 14 is able to be shifted by an operating travel up to the "free travel", without the shifting of the main brake cylinder floating piston by the shift travel up to the shift travel limit effecting a pressure increase in the main brake cylinder. This "free travel" developed in the first mode requires no gap to be overcome/to be closed between a first contact part of brake actuating element 14 and a second contact part of the main brake cylinder floating piston.

The brake system is also able to be controlled, by closing of first valve 18, into a second mode, in which a pressure increase in main brake cylinder 10 using the shifting in of the main cylinder floating piston by a shift travel below the shift travel limit is able to be effected. After controlling the brake system to the second mode, by closing first valve 18, the driver thus has the possibility, via an operation of the brake actuating travel below the free travel (that is able to be switched off/deactivated) of effecting a pressure increase in main brake cylinder 10. The closing of first valve 18 is able to be carried out faster than the usually performed overcoming/closing of the "free travel" for a pressure buildup in a main brake cylinder. Besides that, this control of the brake system that is able to be executed in the second mode without a force to be summoned up by the driver. As will be described in greater detail below, in the brake system the disadvantages of a usual brake system having a mechanically developed free travel may be done without, by a gap between a first contact part of brake actuating element 14 and a second contact part of the main brake cylinder floating piston.

First valve 18 and storage chamber 20 are thus used for implementing a free travel that is changeable and/or able to be switched off. If first valve 18 is (at least partially) opened, the braking medium volume may be shifted from main brake cylinder 10 into storage chamber 20, without at first producing a pressure buildup in main brake cylinder 10, and a braking effect triggered by it. If valve 18 is closed, on the other hand, operating brake actuating element 14 at simultaneous joint actuation of main brake cylinder floating piston directly, and preferably without a mechanical free travel, effects a pressure buildup in main brake cylinder 10, which is able to trigger a braking effect.

First valve 18 is preferably developed as a currentless closed valve. Consequently, the brake system is controlled automatically into its second mode, in response to a functional impairment/failure of its electronic system or its current supply, in which operating brake actuating element 14 by an actuating travel below the "free travel" already has the effect of a pressure increase in main brake cylinder 10. The driver is therefore able to brake the vehicle in such a situation rapidly and/or using a low force effort In the specific embodiment shown, the brake system also includes two brake circuits 26 and 28, which are connected hydraulically to main brake cylinder 10. First brake circuit 26 is connected hydraulically via a second valve 30 to main brake cylinder 10 in such a way that, via (at least partially) opened second valve 30, a pressure increase in main brake cylinder 10 in at least one wheel brake cylinder 32a and 32b of first brake circuit 26 is able to be passed on. In contrast to this, when second valve 30 is present in its closed state, a pressure increase is prevented in the at least one wheel brake cylinder 32a and/or 32b of first brake circuit 26, in spite of a pressure increase in main brake cylinder 10. Because of this, a feedthrough from the main brake cylinder into the at least one wheel brake cylinder 32a or 32b of first brake circuit 26 is prevented in response to a second closed valve 30. Consequently, via an (at least partial) opening of second valve 30, a hydraulic reaction of the at least one wheel brake cylinder 32a and/or 32b of first brake circuit 26 on a pressure increase in main brake cylinder 10 is able to be assured, whereas first brake circuit 26 is "able to be hydraulically decoupled" from main brake cylinder 30 via closing second valve 30.

In one cost-effective specific embodiment, second valve 30 may be developed as an electrically controllable switching valve/separating valve, which is able to be switched only into a closed state and an open state. As an alternative to this, the second valve may also be a valve that is continuously adjustable/continuously controllable. Preferably, second valve 30 is developed as a valve that is open when no current is supplied. Consequently, the driver is still able to brake safely into first brake circuit 26, even when there is a functional impairment/a failure of the electronic system or of the power supply of the brake system.

The brake system preferably includes a control device 34 that is only partially reproduced in its function, by which first valve 18 and second valve 30 are able to be connected in phase opposition. For example, via supplying valves 18 and 30 with current using a control signal 36, first valve 18, developed as closed when there is no current, is able to be closed in response to the opening of the second valve 30, that is developed as open when there is no current, and in response to closing second valve 30 be correspondingly closed. Consequently, a cost-effective electronic system may be used for control device 34.

In one advantageous specific embodiment, first brake circuit 26 is designed so that a braking pressure is able to be built up/set in the at least one wheel brake cylinder 32a and/or 32b of first braking circuit 26 after the closing of second valve 30 independently of a pressure present in second brake circuit 28 and main brake cylinder 10. We shall now describe below a suitable design of first brake circuit 26 for an actively adjustable brake pressure in two wheel brake cylinders 32a and 32b after the closing of second valve 30. The brake system described here is, however, not limited to such a development of first brake circuit 26.

In the specific embodiment shown, first brake circuit 26 has a first pump 38, via which a volume is able to be pumped from brake medium reservoir 12 into at least one wheel brake cylinder 32a and 32b.

In the same way, using first pump 38, a volume may be conveyed back from first brake circuit 26 into brake medium reservoir 12. For this, first brake circuit 26 is connected to brake medium reservoir 12 via an intake line 40. To control a brake medium shift from at least one wheel brake cylinder 32a and 32b into brake medium reservoir 12, first brake circuit 26 may include at least one continuously adjustable valve, via which wheel brake cylinders 32a and 32b are connected hydraulically to brake medium reservoir 12. In the specific embodiment shown, wheel outlet valves 42a and 42b that are assigned to wheel brake cylinders 32a and 32b are developed as continuously adjustable valves. In this case, the active reduction of the brake pressure in wheel brake cylinders 32a and 32b by brake medium shifting into brake medium reservoir 12 is able to be carried out without an additional continuously adjustable valve of first brake circuit 26. The brake medium shift from first brake circuit 26 into brake medium reservoir 40 is also able to be carried out, however, without wheel outlet valves 42a and 42b being especially developed as the at least one continuously adjustable valve.

An advantageous connection of the components of first brake circuit 26 to main brake cylinder 10 and to brake medium reservoir 12 is described below. The executability of a brake circuit of the brake system using first pump 38 and the at least one adjustable valve 42a and 42b for setting a brake pressure in the at least one wheel-brake cylinder 32a and 32b is not, however, limited to this manner of connecting.

First brake circuit 26 is situated on a first supply line 44, via which first valve 18, a line 46 leading from first valve 18 to storage chamber 20 and storage chamber 20 are connected to main brake cylinder 10. Second valve 30 is hydraulically connected via a branching point 48 in first supply line 44 and a line 50 leading from it to main brake cylinder 10. A line 52 leads from second valve 30 to a first wheel inlet valve 54a, which is associated with a first wheel brake cylinder 32a of first brake circuit 26. Via a branching point 56 situated in line 52 and a line 58, leading away from it, a wheel inlet valve 54b, assigned to second wheel brake cylinder 32b of first brake circuit 26, is connected to second valve 30. Each of the two wheel inlet valves 54a and 54b is connected via a line 60a or 60b to the associated wheel brake cylinder 32a and 32b. In parallel to each of the two wheel inlet valves 64a and 64b there runs in each case a bypass line 62a and 62b having a check valve 64a and 64b. Check valves 64a and 64b are aligned in such a way that a brake medium shift through associated bypass line 62a or 62b from second valve 30 to associated wheel brake cylinder 32a or 32b is prevented.

In each line 60a and 60b a branching point 66a and 66b is developed, by which each of wheel outlet valves 42a or 42b, already described above, is connected via a line 68a or 68b. From each wheel outlet valve 42a and 42b, a line 70a and 70b leads to a common branching point 72. Branching point 72 is connected to the suction side of first pump 38 via a line 74. Suction line 40, described above, runs from the delivery side of first pump 38. An overpressure valve 76 is inserted into suction line 40, whose function will be described in greater detail below. Parallel to first pump 38 and overpressure valve 76, there also runs a bypass line 78, which connects line 74 to suction line 40. In addition, via a line 80, the delivery side of first pump 38 is connected to a branching point 82 developed in line 52. A first pressure sensor 84 of first brake circuit 26 is also connected to line 52.

In the specific embodiment shown, the brake system has a second brake circuit 28 in addition to first brake circuit 26. The brake system described here is, however, not limited to the equipment with the subsequently described second brake circuit 28:

Second brake circuit 28 may be developed so that the braking pressure in the at least one wheel brake cylinder 86a and 86b of second brake circuit 28 (automatically) increases in response to an increase in the internal pressure in main brake cylinder 10. One may also put it this way, that, after overcoming a free travel that is able to be set using an (at least partial) opening of first valve 18 and/or after switching off/deactivating the free travel by closing first valve 18, the driver has the possibility of braking directly into the at least one wheel brake cylinder 86 of second brake circuit 28. In particular, second brake circuit 28 may correspond to a conventional ESP system.

In the specific embodiment shown, second brake circuit 28 is hydraulically connected via a second supply line 88, which leads to a main switching valve 90 of second brake circuit 28, to main brake cylinder 10. Via a branching point 92 situated in second supply line 88 and a line 94, leading away from it, a switchover valve 96 of second brake circuit 28 is also connected to main brake cylinder 10. Parallel to switchover valve 96, there runs a bypass line 98 in which a check valve 100 is situated. Check valve 100 is oriented so as to prevent a shifting of brake medium through bypass line 98 from a line 102, situated on wheel brake cylinder side on switchover valve 96, to line 94. A second pressure sensor 106 is also situated on second brake circuit 28 via a branching point 104 in second supply line 88.

A line 102 connects switchover valve 96 to a first wheel inlet valve 108a, which is associated with a first wheel brake cylinder 86a of second brake circuit 28. Via a branching point 110 situated in line 102 and a line 112, leading away from it, a wheel inlet valve 108b, assigned to second wheel brake cylinder 86b of second brake circuit 28, is connected to switchover valve 96. Each of the two wheel inlet valves 108a and 108b is connected via respectively a line 114a or 114b to the associated wheel brake cylinder 86a or 86b of second brake circuit 28. In parallel to each of the two wheel inlet valves 108a and 108b, there runs in each case a bypass line 116a and 116b having a check valve 118a and 118b respectively. Each of check valves 118a and 118b is aligned in such a way that a brake medium shift through associated bypass line 116a or 116b from line 102 to associated wheel brake cylinder 86a or 32b is prevented. Each of the two wheel brake cylinders 86a and 86b of second brake circuit 28 is also assigned a wheel outlet valve 120a and 120b respectively, which is connected via a line 122a or 122b respectively to a branching point 124a developed in line 114a or to a branching point 124b developed in line 114b. The two wheel outlet valves 120a and 120b are also connected via respectively line 126a and 126b to a common branching point 128. A line 130 runs from branching point 128 to an intake side of a second pump 132. Main switching valve 90 is also connected to the delivery side of second pump 132 via a branching point 134, developed in line 130, and a line 136. Furthermore, an additional storage chamber 138 is connected to the delivery side of second pump 132 via a branching point 140 developed in line 130. An overpressure valve 142 in line 130 is aligned so that a brake medium shift from wheel outlet valves 120a and 120b to the suction side of second pump 132 is only possible at a certain pressure. Via a line 144, the delivery side of second pump 132 is connected to a branching point 146 developed in line 102.

First pump 38 and second pump 132 are preferably situated on a common shaft 148 of a motor 150. At a joint operation of first pump 38 together with second pump 132, the overpressure valve, situated in suction line 40, ensures a transferring back of the brake medium pumped by first pump 38 from brake medium reservoir 12 into brake medium reservoir 12, so that no overpressure is built up in first brake circuit 26. For example, the two wheel inlet valves 54a and 54b are closed when first pump 38 is running along, if, in response to maintaining the brake pressure in first brake circuit 26, the brake pressure in the second brake circuit is to be increased using second pump 132. In this case, a high pressure often builds up, usually between the delivery side of first pump 38 and wheel inlet valves 54a and 54b. By an advantageous positioning of overpressure valve 96, the conveyed volume may, however, be transferred via opened overpressure valve 76 into brake medium reservoir 12. In this way, damage to the hydraulic unit or an undesired opening of a valve 54a or 54b is able to be avoided.

Based on the advantageous design of second brake circuit 28, even when second pump 132 is operated along with first pump 38, an undesired pressure buildup in second brake circuit 28 is prevented. Particularly by closing main switching valve 90 one is able to ensure that the additional operation of second pump 132 does not have the effect of an undesired (additional) pressure buildup in second brake circuit 28.

First pump 38 and/or second pump 132 may be a three-piston pump. The brake system described here is thus able to be executed as a six-piston ESP system. Instead of a three-piston pump, however, one may also use a pump having a different number of pistons, an asymmetric pump and/or a gear pump as first pump 38 and/or as second pump 132.

The brake system shown in FIG. 1 has exactly twelve electrically actuatable valves 18, 30, 42a, 42b, 54a, 54b, 90, 96, 108a, 108b, 120a and 120b which, with the aid of control device 34, are controllable at least in one opened and one closed state. Based on the number of actuatable valves, control device 34 may be executed in a cost-effective manner.

Wheel inlet valves 54a, 54b, 108a and 108b and switchover valve 96 are preferably designed as open valves when there is no current. By contrast, for wheel outlet valves 42a, 41b, 120a and 120b and main switching valve 90, a closed design, when the is no current, is preferred.

The two wheel brake cylinders 32a and 32b of first brake circuit 26 may be assigned to the wheels of a first vehicle axle, while the two wheel brake cylinders 86a and 86b of second brake circuit 28 are assigned to the wheels of a second vehicle axis. Wheel brake cylinders 32a and 32b of the first brake circuit are preferably assigned to the rear axle. In this case, it is of advantage if a generator (not drawn in the figure) is also situated on the rear axle. The brake system described here is, however, not limited to a brake-circuit subdivision by axle. Instead, the brake system may also be used in a vehicle having an X brake circuit subdivision.

A particularly advantageous procedure is described below for using the brake system described above for blending a generator-brake torque. The feasibility of the brake system is not, however, limited to this process.

In the non-braked case, that is, in response to a non-operation of brake actuating element 14, all the valves 18, 30, 42a, 42b, 54a, 54b, 90, 96, 108a, 108b, 120a and 120b are without current. Upon operation of the brake actuating element, the driver brakes into main brake cylinder 10 (preferably without overcoming an air gap between brake actuating element 14 and the main brake cylinder floating piston). Using sensor 14 or a corresponding sensor system, the braking command of the driver is able to be recorded at once. While taking into account the charge state of the battery, the current vehicle speed, the current traffic situation, the recorded environmental conditions, the driver's brake force, the braking travel and/or the speed of the operation of brake actuating element 14, it may be determined next whether the braking process is to be utilized for charging the battery connected to the generator. If charging the battery is not provided, first valve 18 is controlled to be in the closed state and second valve 30 in the opened state. In this case, the operation of brake actuating element 14 leads to an increase in the internal pressure in main brake cylinder 10 and correspondingly to an (automatic) increase in the braking pressure in wheel brake cylinders 32a, 32b, 86a and 86b.

Provided the braking process is to be utilized for charging the battery connected to the generator, first valve 18 may be opened and second valve 30 may be closed upon detection of the driver's command. Consequently, at least the above-mentioned, specified storage volume of the brake medium may be shifted into storage chamber 20 without counterpressure. This prevents a pressure buildup in main brake cylinder 10. Accordingly, pressure is not increased in either of the two brake circuits 26 and 28. Instead, the generator may be used to charge the battery, without exceeding the maximum vehicle deceleration specified by the driver. With that, one is able to implement an identical functionality compared to a usual free travel by developing a gap between brake actuating element 14 and the main brake cylinder floating piston.

In supplement, there is the possibility of fixing a difference between a setpoint overall braking torque specified using the operation of brake actuating element 14 and the generator braking torque exerted, and subsequently to set the braking pressure in at least one of wheel brake cylinders 32a and 32b, that are decoupled from main brake cylinder 10, of the first brake circuit actively in such a way that the setpoint overall brake torque is maintained. This is made possible via a corresponding actuation of first pump 38 and/or at least one of the two wheel outlet valves 42a and 42b. The blending process is thus not noticed by the driver, or barely so.

One advantageous actuation of wheel outlet valves 42a and 42b of first brake circuit 26 for actively setting the braking pressure in assigned wheel brake cylinders 32a and 32b may be carried out, in response to a complete closing of one of the two wheel outlet valves 42a or 42b, by the regulation of the overall braking pressure taking place of the two wheel brake cylinders 32a and 32b over the other (non-closed) wheel outlet valve 42a or 42b. In particular for a brake release, one of the two wheel outlet valves 42a and 42b of first brake circuit 26 may be opened and the overall braking pressure may be set in the associated wheel brake cylinders 32a and 32b corresponding to the declining braking command. The brake medium volume exiting from the at least one wheel brake cylinder 32a and 32b may be transferred back via at least one of wheel outlet valves 42a or 42b into braking medium reservoir 12.

Other actuating strategies for actively setting braking pressures in the two wheel brake cylinders 32a and 32b of first brake circuit 26 may also be carried out. Instead of setting the braking pressure in wheel brake cylinder 32a and 32b using Δ-P actuation of wheel outlet valves 42a and 42b, in addition a pressure regulation may be carried out using first pressure sensor 84 or at least one pressure sensor on a wheel assigned to wheel brake cylinders 32a or 32b.

After the shifting of the specified storage volume into storage chamber 20, the pressure buildup may take place in second brake circuit 28, conventionally and independently of the overall braking pressure of the two wheel brake cylinders 32a and 32b of first brake circuit 26, or be modulated by the driver. In the same manner, active pressure buildups are also able to be carried out without the operation of brake actuating element 14 by the driver in a conventional way, by opening main switching valve 90 in second brake circuit 28.

It should be pointed out that the procedure described in the above paragraphs for maintaining a setpoint vehicle deceleration specified by the driver may also be performed without activating the generator.

Figure 2:
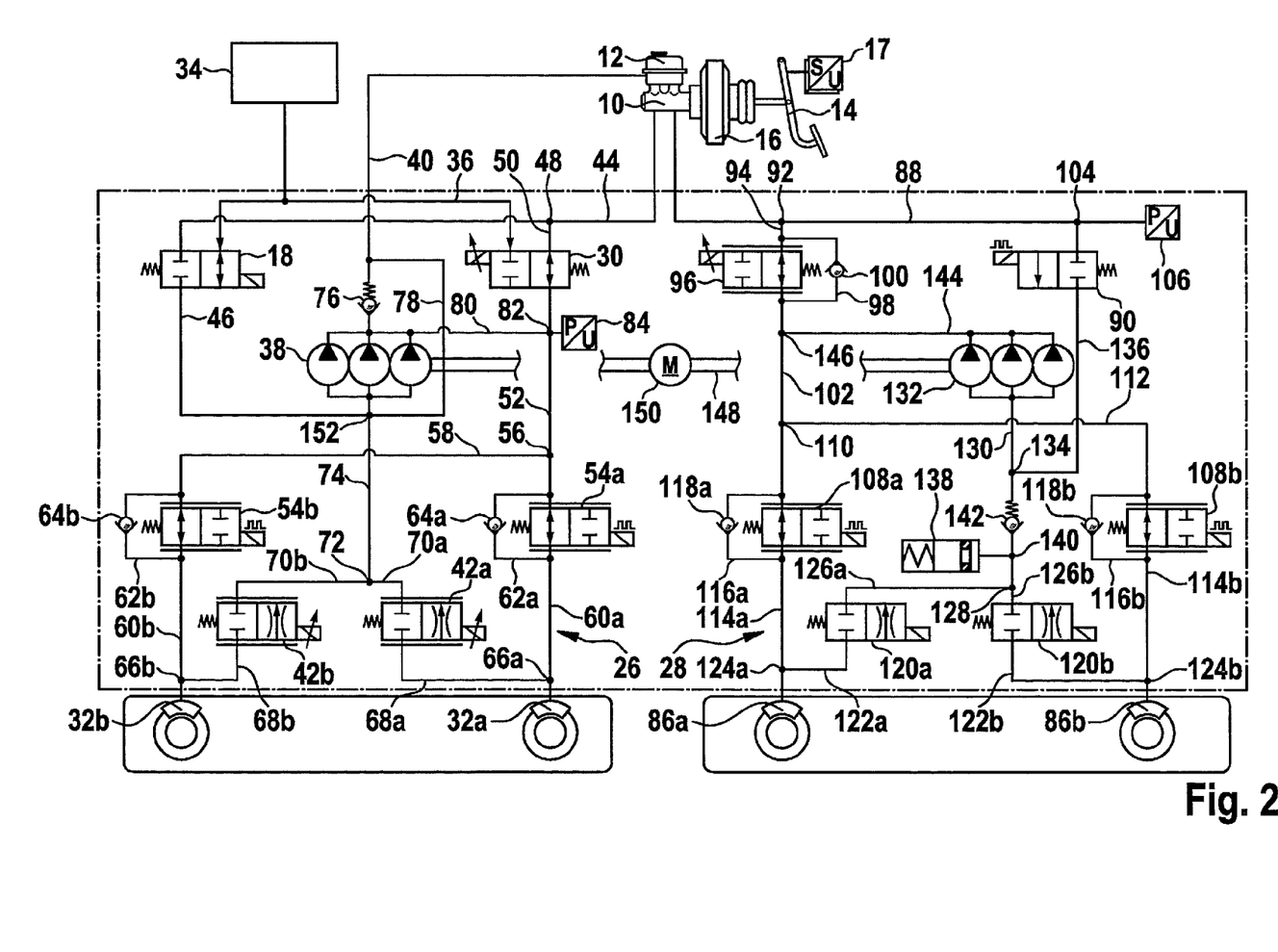
FIG. 2 shows a circuit diagram of a second specific embodiment of the brake system.

FIG. 2 shows a circuit diagram of a second specific embodiment of the brake system.

The brake system shown in FIG. 2 differs from the specific embodiment described above in that one may do without equipping the brake system with a storage chamber as the storage device for the brake medium. Instead, first valve 18 is connected via line 46 and branching point 152 in line 74 to brake medium reservoir 12.

First valve 18 thus opens or closes a hydraulic connection between main brake cylinder 10 and brake medium reservoir 12. Consequently, the possibility exists, after the opening of first valve 18, of transferring the brake medium volume shifted from main brake cylinder 10 into brake medium reservoir 12 without counterpressure, in response to an adjusting of the main brake cylinder floating piston by a shift travel that is below the shift travel limit corresponding to brake medium reservoir 12. Therefore, after the opening of first valve 18, the shifting in of the main brake cylinder floating piston by the shift travel, that is below the shift travel limit, effects no braking action of a wheel brake cylinder 32a, 32b, 86a or 86b. By contrast, if first valve 18 is closed, an actuation of main brake cylinder floating piston/of brake actuating element 14 directly and without free travel causes a brake pressure increase at least in wheel brake cylinders 86a and 86b. Consequently, the specific embodiment shown here enables a variable free travel setting having the advantages described above, particularly being able advantageously to use the brake system during the blending of a generator braking torque.

Figure 3:
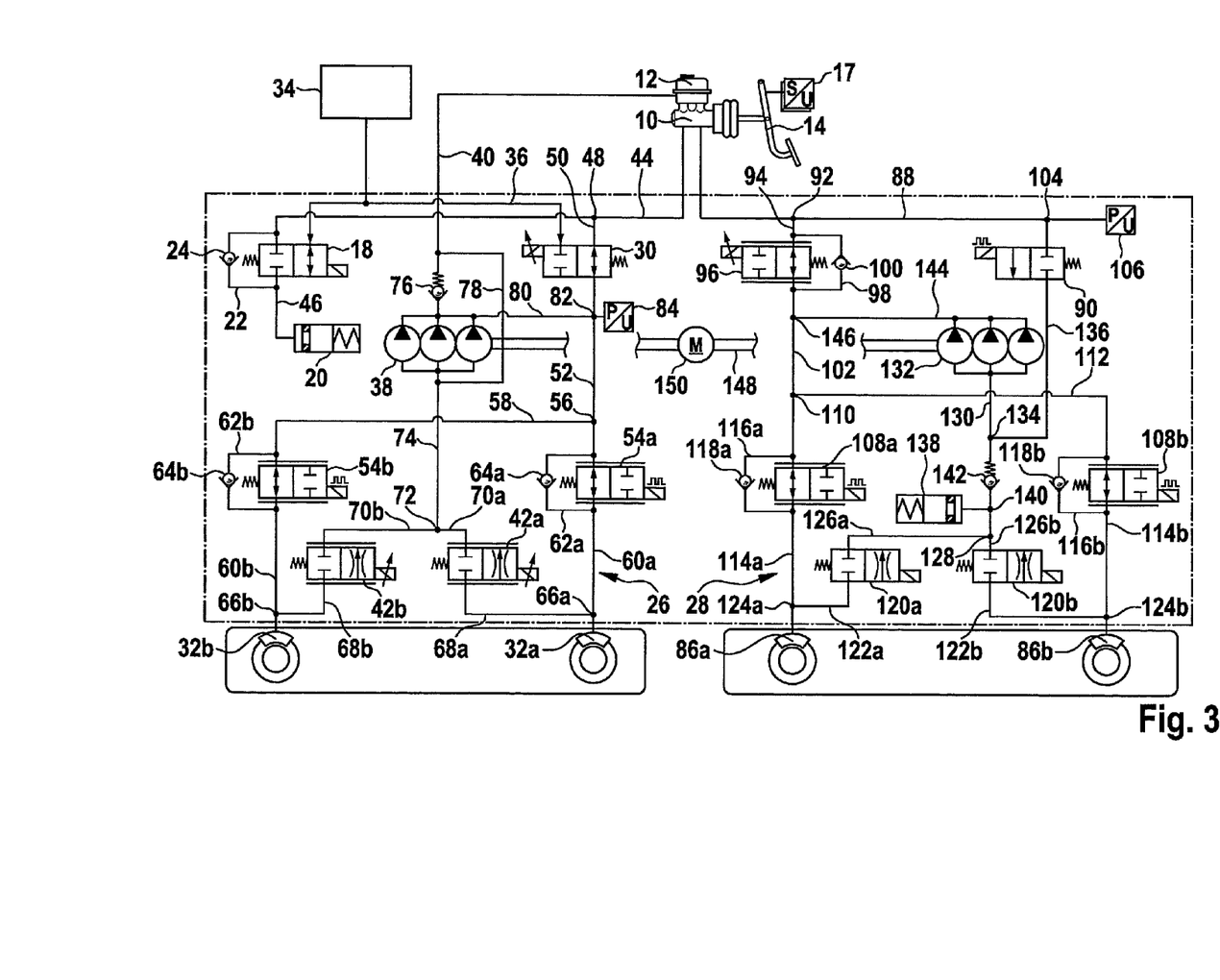
FIGS. 3 & 4 show a circuit diagram of a third and fourth specific embodiment of the brake system.
Figure 4:
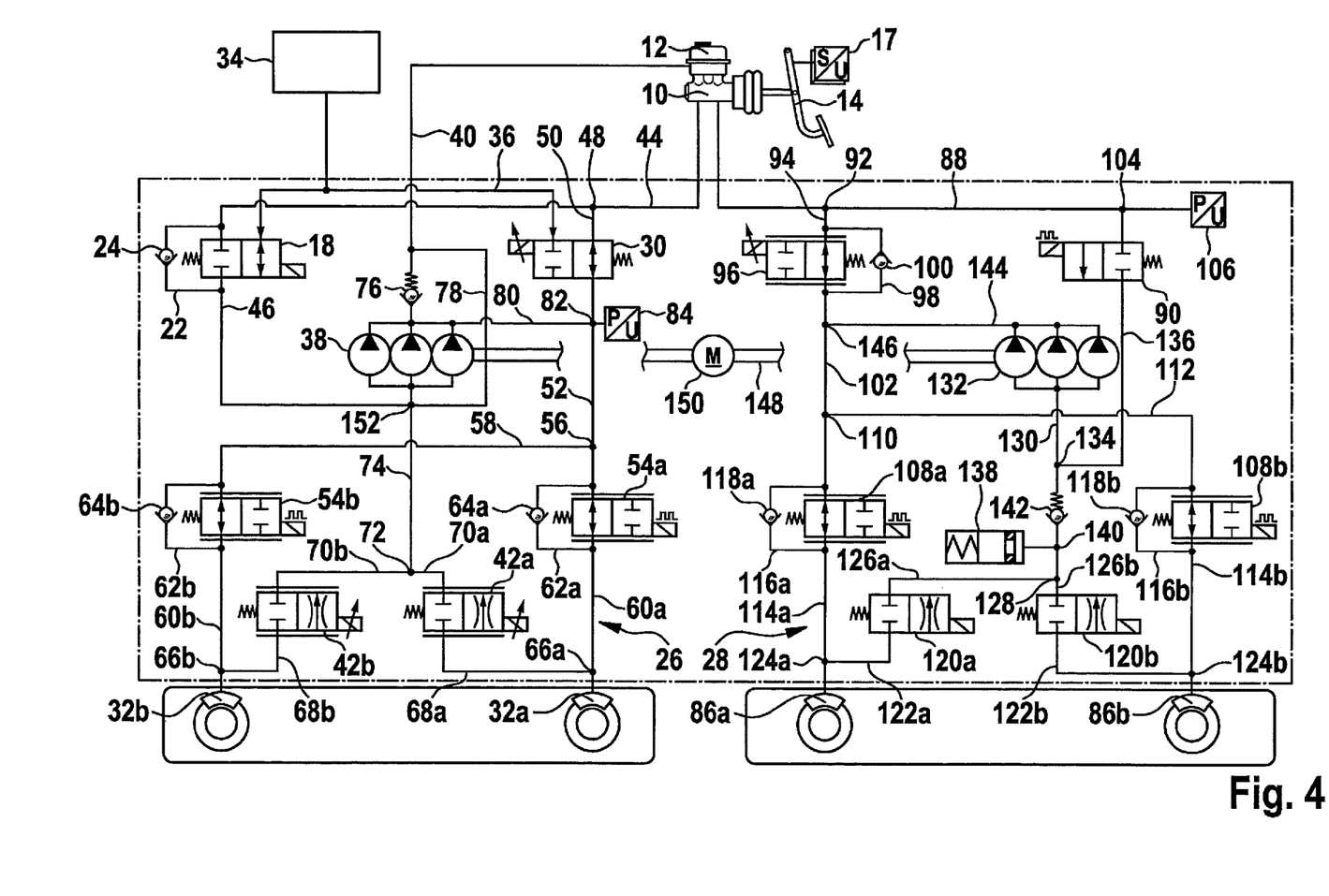

FIGS. 3 and 4 respectively show a circuit diagram of a third and fourth specific embodiment of the brake system.

The specific embodiments shown in FIGS. 3 and 4, as opposed to the abovementioned brake systems, have no brake booster. The brake systems described here are preferably used in a vehicle in such a way that the wheels situated on the front axle of the vehicle are able to be braked using wheel brake cylinders 32a and 32b of first brake circuit 26. Above all, when the brake systems are used in such a way, the advantages as enumerated above are ensured.

Thus, the driver has the possibility of braking in an unboosted manner into the rear axle, and in this manner of obtaining an advantageous braking sensation (pedal feel). The pressure buildup at the front axle may actively take place, whereupon in a preferred manner, a boosting of the driver's braking command that, with respect to force, relieves the driver, is carried out. In addition, these brake systems, in the case of a missing vacuum availability, also have the advantages of an adjustable braking force distribution.

As opposed to a standard brake system, all the abovementioned brake systems additionally ensure the advantage that, based on the rapid detection of the driver's braking command using sensor 17, they are already able to react early to the braking command of the driver.

Figure 5:
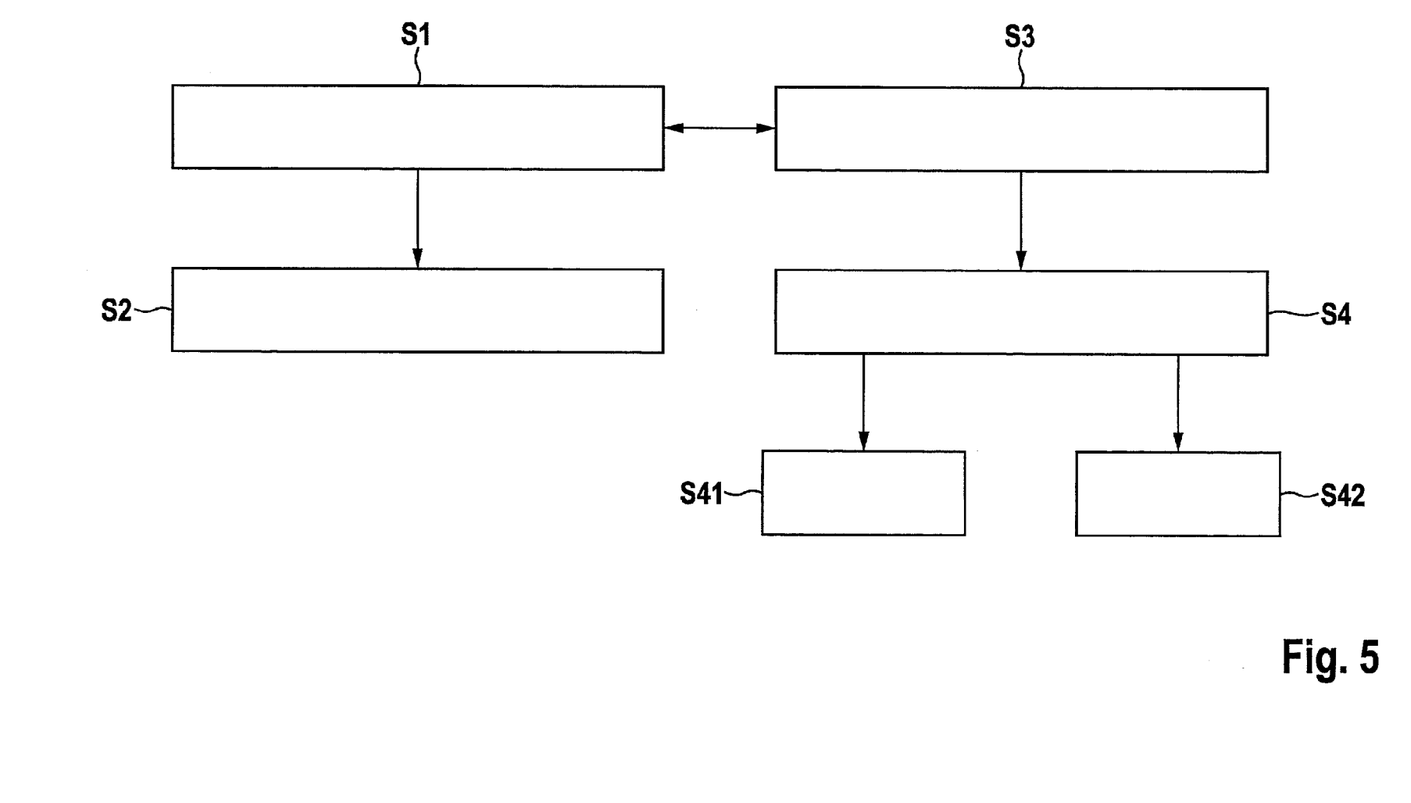
FIG. 5 shows a flow chart showing a specific embodiment of the method.

FIG. 5 shows a flow chart to show a specific embodiment of the method.

The method shown in FIG. 5 may be carried out using a brake system having a main brake cylinder that has a main brake cylinder floating piston that is at least partially able to be shifted into the main brake cylinder, and a brake medium storage device into which a specified storage volume of a brake medium is transferable without counterpressure. It should be noted that the feasibility of the method is not limited to the brake system described above.

In one optionally executable method step S1, an internal pressure in the main brake cylinder is increased in response to the shifting of the main brake cylinder floating piston partially into the main brake cylinder by a shift travel that is below a shift travel limit corresponding to the storage volume. This takes place by closing an electrically controllable first valve, via which the brake medium storage device is hydraulically connected to the main brake cylinder. Together with method step S1, a method step S2 is also carried out in an optional manner, in which a second valve, via which a brake circuit of the braking system is hydraulically connected to the main brake cylinder, using at least one wheel brake cylinder, is controlled into an at least partially opened mode.

Instead of the abovementioned method steps, a method step S3 may optionally be executed, in which an increase in the internal pressure in the main brake cylinder, in response to the shifting of the main brake cylinder floating piston by a shift travel, below the shift travel limit, is prevented by an at least partial opening of the first valve. Consequently, it is ensured that a brake medium volume, smaller than the specified storage volume, is transferred, without counterpressure, from the main brake cylinder, via the at least partially opened first valve, into the brake medium storage device. In a preferred manner, together with method step S3, the second valve is controlled into a closed mode (method step S4), at least when the first valve is (completely) opened.

In supplement to this, after the closing of the second valve, a brake medium volume may be pumped out of a brake medium reservoir into the at least one wheel brake cylinder of the brake circuit (method step S41). As an alternative or in supplement to method step S41, in a method step S42, at least one continuously adjustable valve of the brake circuit, via which the at least one wheel brake cylinder is hydraulically connected to the brake medium reservoir, may also be opened. In this way, one is able to carry out a brake medium displacement from the at least one wheel brake cylinder into the brake medium reservoir. The brake pressure in the at least one wheel brake cylinder of the brake circuit is able to be set actively using method steps S41 and S42.

In a preferred manner, in method step S42, only one of a first wheel outlet valve and a second wheel outlet valve of the brake circuit is at least partially opened as a continuously adjustable valve, to carry out the brake medium displacement from a first wheel brake cylinder or from a second wheel brake cylinder of the brake circuit into the brake medium reservoir. If, for example, one of the two wheel inlet valves of the brake circuit has to be/remain closed because of an ABS control on the associated wheel, the pressure setting may take place via the wheel outlet valve associated with the other wheel of the common axle. The functionality of the regulatable pressure setting may also optionally be carried out using a wheel outlet valve of the two wheel outlet valves of a common axle. Even a possibly required complete brake release may be performed in this manner. Consequently, the method described here may be combined with the usual ABS control.

The execution of the method described above ensures the advantages described, that will not be repeated at this point.

What is claimed is:

1. A brake system for a vehicle, comprising:
    a main brake cylinder;
    a main brake cylinder floating piston configured to be selectively shifted at least partially into the main brake cylinder;
    a brake medium storage device, wherein a specified storage volume of a brake medium is able to be transferred into the brake medium storage device;
    an electrically controllable first valve via which the brake medium storage device is hydraulically connected to the main brake cylinder in such a way that, in response to the shifting of the main brake cylinder floating piston partially into the main brake cylinder by a shift travel less than a shift travel limit corresponding to the specified storage volume, a brake medium volume less than the specified storage volume is transferred from the main brake cylinder via the first valve in at least partially opened state into the brake medium storage device; and
    a control device configured to control the brake system (i) into a first mode by controlling the first valve into the at least partially opened state, wherein in the first mode of the brake system a pressure increase in the main brake cylinder is prevented by shifting the main brake cylinder floating piston partially into the main brake cylinder by the shift travel that is below the shift travel limit, and (ii) into a second mode by controlling the first valve into a closed state, wherein in the second mode of the brake system, in response to a shifting of the main brake cylinder floating piston partially into the main brake cylinder by the shift travel that is below the shift travel limit, a pressure in the main brake cylinder increases.

2. The brake system as recited in claim 1, wherein the brake medium storage device includes at least one of a brake medium reservoir and a low pressure storage chamber.

3. The brake system as recited in claim 1, further comprising:
    at least one first brake circuit having at least one first wheel brake cylinder which is hydraulically connected to the main brake cylinder via a second valve in such a way that, (i) via the second valve in a closed state, a pressure increase is prevented in the at least one first wheel brake cylinder of the first brake circuit in response to the pressure increase in the main brake cylinder, and (ii) via the second valve in at least partially opened state, a pressure increase in the at least one first wheel brake cylinder of the first brake circuit is transferred from the pressure increase in the main brake cylinder.

4. The brake system as recited in claim 3, wherein at least one of (i) the first valve is configured to be a closed valve when currentless, and (ii) the second valve is configured to be an opened valve when currentless.

5. The brake system as recited in claim 3, wherein the first valve and the second valve are configured to be selectively connected in phase opposition using the control device.

6. The brake system as recited in claim 3, wherein the first brake circuit includes a pump, and wherein using the pump an additional brake medium volume is able to be pumped from a brake medium reservoir of the brake medium storage device into the at least one first wheel brake cylinder of the first brake circuit.

7. The brake system as recited in claim 6, further comprising:
    an overpressure valve situated between a delivery side of the pump and the brake medium reservoir.

8. The brake system as recited in claim 3, wherein the first brake circuit includes at least one continuously adjustable valve via which the at least one first wheel brake cylinder of the first brake circuit is hydraulically connected to a brake medium reservoir of the brake medium storage device in such a way that a brake medium shift from the at least one first wheel brake cylinder of the first brake circuit into the brake medium reservoir is controlled using the at least one continuously adjustable valve.

9. The brake system as recited in claim 8, wherein the at least one continuously adjustable valve is configured as a wheel outlet valve.

10. The brake system as recited in claim 3, wherein the brake system contains exactly twelve actuatable valves which are configured to be selectively controlled into an opened state and into a closed state using electrical signals provided by the control device.

11. The brake system as recited in claim 3, further comprising:
    at least a second brake circuit having at least one second wheel brake cylinder which is hydraulically connected to the main brake cylinder via a switchover valve and a main switching valve.

12. A method for operating a brake system for a vehicle having a main brake cylinder and an associated main brake cylinder floating piston configured to be selectively shifted at least partially into the main brake cylinder, and a brake medium storage device into which a specified storage volume of a brake medium is able to be transferred, the method comprising:
    controlling, at a control device, the brake system into a second mode by controlling an electrically controllable first valve via which the brake medium storage device is hydraulically connected to the main brake cylinder into a closed state, and in the second mode, increasing an internal pressure in the main brake cylinder in response to a shift of the main brake cylinder floating piston partially into the main brake cylinder by a shift travel below a shift travel limit corresponding to the specified storage volume; and
    controlling, at the control device, the brake system into a first mode by controlling the first valve into an at least partially opened state, and in the first mode, preventing an increase in the internal pressure in the main brake cylinder in response to a shift of the main brake cylinder floating piston partially into the main brake cylinder by a shift travel below the shift travel limit, so that a brake medium volume less than the specified storage volume is transferred from the main brake cylinder into the brake medium storage device via the at least partially opened first valve.

13. The method as recited in claim 12, wherein the brake system has a second valve via which a brake circuit of the brake system having at least one wheel brake cylinder is hydraulically connected to the main brake cylinder, and wherein the second valve is selectively controlled (i) into an at least partially opened mode in response to the closing of the first valve, and (ii) into a closed mode in response to the opening of the first valve.

14. A method for operating a brake system for a vehicle having a main brake cylinder and an associated main brake cylinder floating piston configured to be selectively shifted at least partially into the main brake cylinder, and a brake medium storage device into which a specified storage volume of a brake medium is able to be transferred, the method comprising:

at least one of:
(a) increasing an internal pressure in the main brake cylinder in response to a shift of the main brake cylinder floating piston partially into the main brake cylinder by a shift travel below a shift travel limit corresponding to the specified storage volume by closing an electrically controllable first valve via which the brake medium storage device is hydraulically connected to the main brake cylinder; and
(b) preventing an increase in the internal pressure in the main brake cylinder in response to a shift of the main brake cylinder floating piston partially into the main brake cylinder by a shift travel below the shift travel limit by an at least partial opening of the first valve, so that a brake medium volume less than the specified storage volume is transferred from the main brake cylinder into the brake medium storage device via the at least partially opened first valve, wherein the brake system has a second valve via which a brake circuit of the brake system having at least one wheel brake cylinder is hydraulically connected to the main brake cylinder, and wherein the second valve is selectively controlled (i) into an at least partially opened mode in response to the closing of the first valve, and (ii) into a closed mode in response to the opening of the first valve; and after a closing of the second valve, performing at least one of the following:
pumping a brake medium volume from a brake medium reservoir of the brake medium storage device into the at least one wheel brake cylinder of the brake circuit; and
opening at least one continuously adjustable valve of the brake circuit, via which the at least one wheel brake cylinder of the brake circuit is hydraulically connected to the brake medium reservoir, to carry out a brake medium shifting from the at least one wheel brake cylinder of the brake circuit into the brake medium reservoir.

15. The method as recited in claim 14, wherein only one of a first wheel outlet valve and a second wheel outlet valve of the brake circuit is opened at least partially to carry out the brake medium shift from one of a first wheel brake cylinder or a second wheel brake cylinder of the brake circuit into the brake medium reservoir.

* * * * *